March 24, 1936.  J. F. McCANN  2,035,242
FRICTION DEVICE
Filed Oct. 29, 1934   3 Sheets-Sheet 1
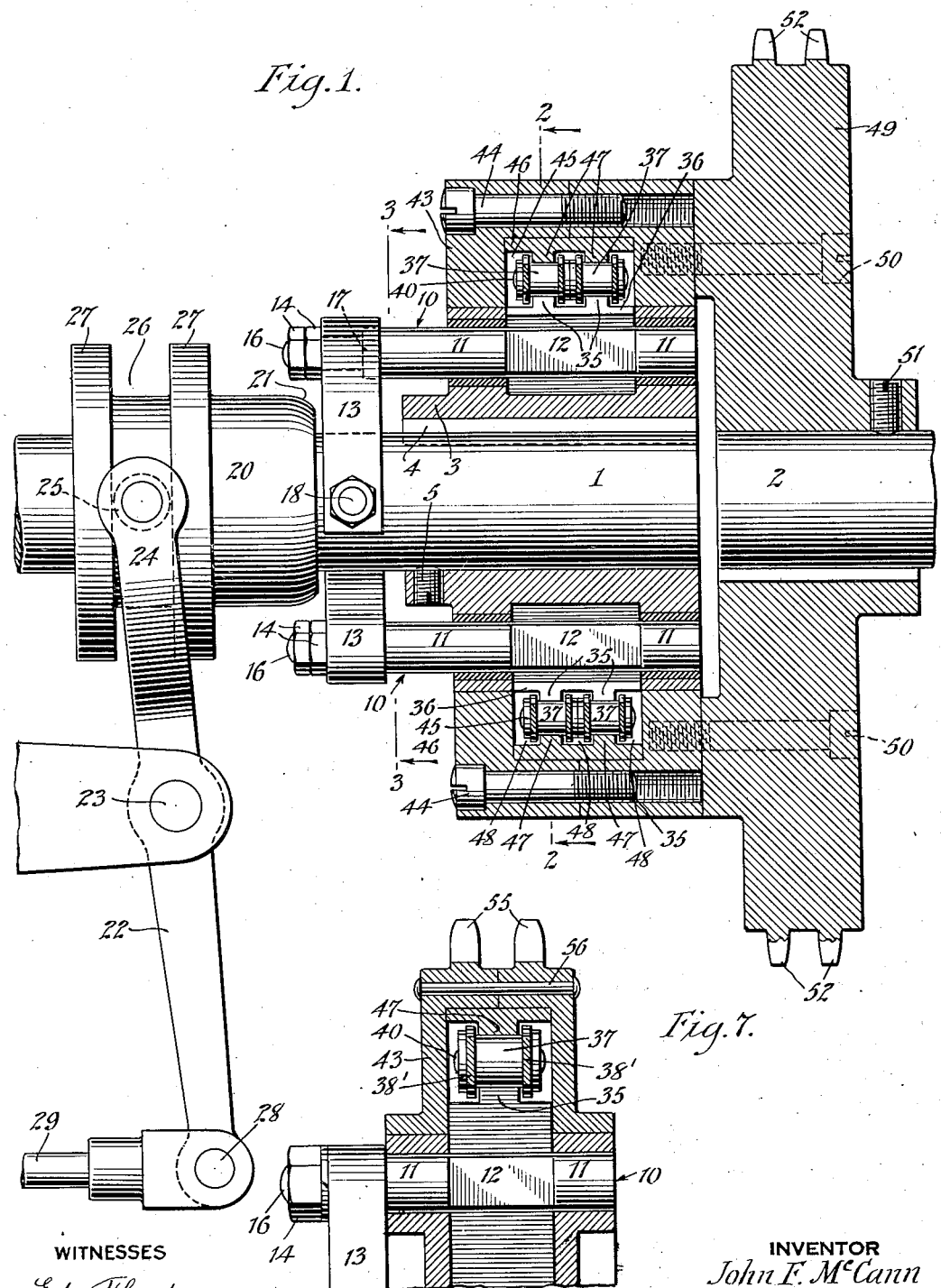
INVENTOR
John F. McCann
BY
Munn, Anderson & Liddy
ATTORNEY

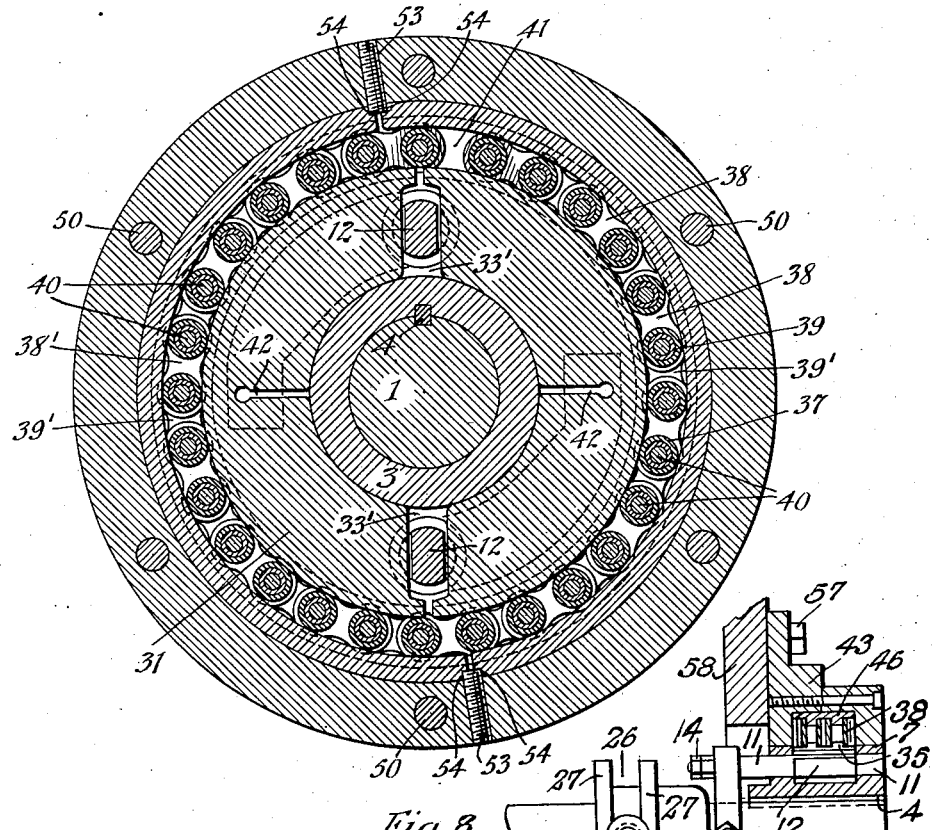

March 24, 1936.   J. F. McCANN   2,035,242
FRICTION DEVICE
Filed Oct. 29, 1934   3 Sheets-Sheet 3

WITNESSES
Edw. Thorpe

INVENTOR
John F. McCann
BY
Munn, Anderson & Liddy
ATTORNEYS

Patented Mar. 24, 1936

2,035,242

UNITED STATES PATENT OFFICE 2,035,242

FRICTION DEVICE

John F. McCann, Springfield, Mass., assignor to Baldwin-Duckworth Chain Corporation, Springfield, Mass., a corporation of Massachusetts Application October 29, 1934, Serial No. 750,548

13 Claims. (Cl. 192—78)

This invention relates to a friction device which may be employed as a machine clutch or a machine brake.

The object of the invention is to provide a clutch or brake which will instantly respond to its actuating control and will unite a driving shaft to a driven shaft when used as a clutch or when used as a brake will instantly function to stop the rotation of a rotating element, all in a smooth manner without shock or load stress, thus protecting the device from abnormal overload and eliminating the transmission of working strains.

To the above ends the present invention may be said to consist of a clutch or brake in which freely rotating rollers are interposed between the adjacent surfaces of relatively moving elements with means to move said rollers radially to clamp said rollers between said opposing surfaces whereby to prevent the relative movement of said elements.

It further consists of the devices and combinations of devices which I hereinafter describe and claim.

The present invention is shown in the accompanying drawings in which the invention is shown as embodied in a clutch.

Fig. 1 is a view partly in section and partly in elevation, the section being taken on a line passing through the longitudinal axis of the driving and driven shafts.

Fig. 2 is a sectional view taken on the line 2—2 in Fig. 1 looking in the direction of the arrows in that figure.

Fig. 3 is an end elevation of portions of the clutch control with certain elements shown in section taken on the line 3—3 in Fig. 1 looking in the direction of the arrows in that figure.

Fig. 7 shows a modified form of the clutch in which a single line of rollers and a single flexible carrier are employed, and showing sprocket teeth upon the periphery of the enclosing casing.

Fig. 8 shows the invention embodied in a brake.

Similar reference characters will be employed throughout the specification and drawings to designate the same part.

Figure 5:
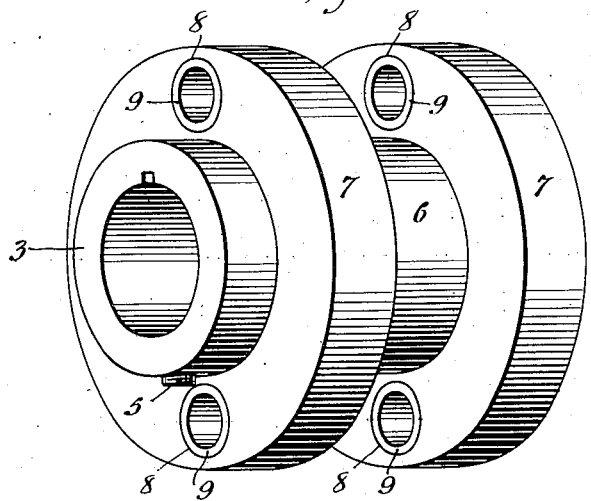
Fig. 5 is a perspective view of the rotating drum which carries the expanding bed or support and the expanding cam rods.
Figure 6:
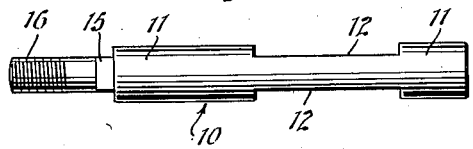
Fig. 6 is an elevation of one of the expanding cam rods removed.

In the drawings 1 indicates a constantly driven shaft operated from any suitable source of power, and 2 indicates the driving or main shaft of any given piece of machinery which is to be operated by power transmitted from the constantly driven shaft 1 when the two shafts are connected by the friction device when used as a clutch. Upon the shaft 1 is mounted to rotate therewith the drum 3 (shown in Fig. 5), it being held thereon by means of a spline 4 and a set screw 5. As shown in Fig. 5, this drum consists of a cylindrical hub 6 provided with annular flanges or collars 7 preferably formed integrally with the hub 6, one of the annular flanges being located at one end of the hub 6, with one face thereof positioned in the vertical plane of the end of the hub whereas the annular flange 7 at the opposite end of the hub is positioned thereon so that the end of the hub projects or extends beyond the outer face of the annular flange (as clearly indicated in Figs. 1 and 5), a sufficient distance to permit the set screw 5 to be employed to attach the hub 3 to the shaft 1 in addition to the spline 4. The annular flanges 7 are each provided at diametrically opposite points with cylindrical openings 8 in which are fitted hardened steel bushings 9 to receive and support the cam rods 10, each of which is provided with cylindrical portions 11 at their opposite ends arranged to fit into and be supported by the steel bushings 9 and to turn therein as required. Between the cylindrical portions 11 the cam rods 10 are cut away (as indicated in Fig. 6), to provide relatively flat cam surfaces 12. In other words, this portion of the cam rods will be provided with flattened faces and will be substantially rectangular in shape, having a cross section longer in one direction than the other. Arms 13 are fixedly secured to the outer ends of the cam rods 10 by means of the nuts 14 and are compelled to rock with each other by means of the squared portion 15 of the threaded end 16 of the cam rods, which squared portion fits into a squared recess 17 (as shown in dotted lines in Fig. 1) in the inner face of the upper end of the arms 13. The arms 13 at their free ends carry bolts 18 having rounded heads 19 and when assembled (as shown in Figs. 1, 2 and 3 of the drawings), the rounded heads of the bolts 19 will be diametrically opposite each other on a horizontal line corresponding to the diameter of the shafts 1 and 2. The rounded heads 19 of the bolts 18 are in position to be engaged by a sliding sleeve or actuator 20 having a curved end 21, the actuator 20 being loosely mounted on a shaft 1 and arranged to be moved along the said shaft by any suitable means such as a lever 22 pivotally mounted at 23 and provided at its upper end with a yoke 24 and carrying rollers 25 (shown in dotted lines in Fig. 1), engaging the groove or track 26 between the flanges 27, the lower end of the lever 22 being pivotally connected at 28 to a rod 29.

The foregoing arrangement is such that the movement of the actuator 20 along the shaft 1, from left to right in Fig. 1, will cause its rounded end 21 to engage the rounded heads 19 of the bolts 18 and thus spread the lower ends of the arms 13 imparting a rocking movement to the cam rods 10, whereas a movement of the actuator 20 in the opposite direction will permit the arms 13 and the cam rods to resume their normal position.

Figure 4:
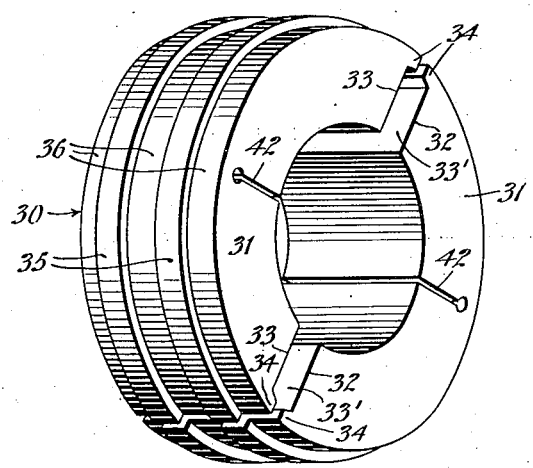
Fig. 4 shows in perspective the expanding bed or support for the rollers and their flexible carrier in that form of the device shown in Fig. 1.

The hub 6 between the annular flanges 7 receives and supports the expanding bed 30 (see Fig. 4), which in the illustrated embodiment comprises two segmental sections 31. When placed in position on the hub 6, the expanding bed 30 will be positioned as shown in Fig. 2, so that the adjacent ends 32 and 33 will form a recess 33' having substantially parallel walls, and of a width to receive the rectangular or cut away portion 12 of the cam rods 10 with the longer axis extending in a line parallel to the adjacent walls of the recesses formed by the meeting ends of the sections 31 of the expanding bed, all as clearly shown in Fig. 2 of the drawings. Preferably the meeting ends of the sections 31 will also be provided with projections 34 extending toward each other and normally spaced apart from each other (as shown in Fig. 4), but closing to a considerable extent the outer ends of the recesses formed by the meeting faces 32 of the members 31.

It will be noted that, when assembled, the cylindrical portions 11 of the cam rods 10, being of a diameter greater than the lateral diameter of the rectangular portion of the cam rods 10, will prevent the cam rods from sliding out of the position shown in Fig. 1, thus holding the cam rods with their rectangular portions 12 in proper relation to the adjacent ends of the sections 31 of the expanding bed 30. The expanding bed members 30 are of hardened steel and upon the outer surfaces are provided with annular ribs 35 and annular channels 36.

Loosely supported by the expanding bed 30 are a plurality of rollers 37 carried by a flexible carrier 38. The flexible carrier 38 consists of chain links 38' which at their opposite ends are provided with fixed sleeves 39 extending transversely and fixedly connecting the opposite ends of the links 38'. Each of the sleeves 39 will carry a roller 37 free to revolve thereon. Adjacent pairs of links and their sleeves and rollers are connected to each other by coupling links 39' and coupling pins 40 which pass through the sleeves 39. The above arrangement is such that a flexible articulated carrier is provided with the freely revolving rollers 37 extending transversely across the periphery of the sections 31 of the expanding bed 30 with the rollers 37 in position to rest upon the ribs 35 and with the links of the articulated carrier riding in the tracks or grooves adjacent to the ribs 35 and upon opposite sides thereof (as clearly shown in Fig. 1 of the drawings).

It is of course understood that the articulated carrier will be of a length to surround the entire outer surface of the expanding bed 30 with the meeting ends of the articulated carrier spaced slightly from each other (as indicated at 41 in Fig. 2 of the drawings), and that the links 38 will be of such relative length that the rollers 37 will be closely adjacent to each other and provide a practically continuous line of rollers entirely surrounding the expanding bed 30.

The articulated carrier is preferably formed of a length of what is generally known as a silent chain in which, when properly made, there is very little wear and consequent stretch or elongation, the result of wear. It is of a length which will almost but not quite surround the expanding bed 30 and the ends are free and disconnected leaving a space 41 to provide for the prorated pitch elongation which naturally takes place due to the relatively slight wear of the parts which as the elongation takes place will bring the ends of the chain closer together, the space 41 providing for this conforming of the chain and the slight elongation which may take place in the operation thereof.

The foregoing arrangement is such that, assuming the parts to be assembled as shown in Fig. 2, the rocking of the cam rods 10 will cause the flattened portions 12 thereof to spread the sections 31 radially and thus impart a radial movement to the articulated carrier and the rolls carried thereby. In order to provide for a slight resilient action of the members 31, they may be provided with slots 42 extending from the inner surface to a point adjacent the outer surface and located at a point intermediate the opposite ends of the sections 31. This will permit a slight resilient expanding action of each of the members 31.

Surrounding the bed 30 and the rollers 37 and their articulated carrier is a casing 43 which in the illustrated embodiment is composed of the mating annular members secured together by the screws 44, the shape of the members 43 being such that when secured together they will form upon their inner periphery an enclosing chamber 45 of substantially the same width as that of the expanding bed 30 (as clearly shown in Fig. 1 of the drawings). Within the chamber 45 there is provided a hardened steel track 46, the inner face of which is provided with annular ribs and grooves 47 and 48, corresponding to the annular ribs and grooves 35 and 36 of the expanding bed 30. The ribs 35 and 47 are disposed opposite to each other in the same vertical plane, the space between the ribs 35 and 47 being slightly greater than the diameter of the rollers 37, so that under normal conditions the rollers as they are carried around by the shaft 1 and the expanding bed 30 may have a rolling action between the opposed ribs or tracks 35 and 47. When the members 31 of the expanding bed 30, however, are spread radially outward by the rocking of the cam rods 10, the rollers and the articulated flexible carrier will be moved radially so that the rollers will be gripped between the opposed faces of the tracks 35 and 47, and slightly compress the rollers so that they will not revolve on the sleeves thus locking the expanding bed and casing together.

Inasmuch as the clearance between the inside diameter of the rollers 37 and the outside diameter of the bushings 39 in the chain or flexible carrier is very slight, approximately 2/1000ths of an inch, there is enough elasticity or yield in most any kind of steel to permit the slight compression which is required. I have found, however, that a fairly medium carbon steel heat treated and drawn to prevent brittleness gives the best results. Specific analysis and heat treatment of the chain actually used by me is #3140 S. A. E.—Carbon .35 to .40, nickel 1.00 to 1.50, chrome .45 to .75, heat treatment—1350 degrees F. quenched in oil, then reheated to 700 degrees F. With such a chain or carrier for the rollers the slight elasticity required to compress the rollers against the bushings and to enable the rollers to resume their normal cylindrical shape when the pressure has been released will be found to be present and effective.

It is of course understood that the casing 43 may remain stationary while the shaft 1 is rotating or may be picked up and locked to the hub 3 to rotate therewith at times by the expansion of the members of the expanding bed and the rollers, which will cause said rollers to be gripped between the opposed tracks 35 and 47 to rotate with the shaft 1. As shown in Fig. 1 the shaft 2, which represents the driving shaft of any machine designed to be operated by power transmitted from the shaft 1, may be connected to or driven by the casing 43, as by means of a sprocket wheel 49 secured by means of bolts 50 to the casing 43, said sprocket wheel being secured in any manner to the shaft 2, as by means of the set screw 51. The sprocket wheel 49 may have suitable sprocket teeth 52 for driving a sprocket chain.

For convenience in assemblage, the track 46 is made of two semi-circular sections (as shown in Fig. 2) and are held in place within the casing by set screws 53 passing through the outer wall of the casing members with the lower ends of the screws 53 engaging complementary notches 54 in the adjacent ends of each section of the track 46. By so constructing the track 46 it may be readily placed in position, and furthermore it may be readily hardened to resist the wear of the rollers or other contacting parts. It will be understood of course that all parts subject to considerable stress or wear may be made of hardened steel.

In Fig. 7 a modified form of the device is shown, in which the casing surrounding the rollers is provided on its periphery with sprocket teeth 55 and in which a single line of rollers 43 and a single flexible articulated carrier for such rollers is employed instead of a double line of rollers and two carriers (as in Fig. 1). In this form also the two members of the casing 43 are united by rivets 56. In Fig. 7 also the expanding bed will be provided on its periphery with a single rib or track 35, and in this form of the invention the track 46 carries a single rib 47, otherwise the construction may be the same as that shown in Fig. 1.

While I have described the invention as embodied in a clutch in which two rotary elements are arranged to be connected or disconnected at will, in order that they shall rotate in unison or be permitted a relative movement with relation to each other when disconnected, it is to be understood that the invention is equally applicable for use as a brake whereby one element is movable and the other element is fixed, and the object is to bring the rotating element to a standstill by making a temporary connection with the fixed element. Such a modification is shown in Fig. 8 in which the casing 43 is fixedly secured by bolts 57 to a fixed part 58 of the frame of a machine, thus the casing 43 remains stationary while the shaft 1, the hub 3, flexible carrier, and the expanding bed and its operating cam rods rotate with the shaft 1. Excepting that the casing 43 does not rotate, all the parts shown in Fig. 8 are substantially the same as heretofore described. In this modification the spreading of the arms 13 will rock the cam rods 11 causing the cams 12 to move the members of the expanding bed radially, thus causing the friction surfaces on the bed and the casing to engage the friction surfaces of the flexible carrier 38, thus locking the shaft 1 (which in this instance becomes the driven shaft) to the fixed frame 58 stopping its rotation and the rotation of the parts carried thereby.

In the operation of the apparatus as shown and described, assuming the shaft 1 to be constantly driven from any suitable source of power with the parts in the position shown in the drawings, the expanding bed with the cam rods will rotate with the shaft 1, and during such operation the rollers really operate as antifriction rollers, in fact, if desired, they may be lubricated by any desired lubricant within the chamber in which the rollers are located. In this operation, of course, the rollers rest upon the supporting tracks 35. Whenever it is required to pick up shaft 2 so that it may rotate with shaft 1, the actuator 20 is moved along shaft 1 so that its rounded end engages the studs 19 carried by the arms 13, thereby spreading the arms and turning the cam rods 10. This causes the rectangular portion 12 of the cam rods to spread the expanding members 31 radially, thereby compressing the rollers 37 between the tracks 35 and 47, causing the rollers to be locked upon the rollers sleeves, the articulated carrier moving slightly radially to accommodate this spreading action of the members 31 and locking the parts together so that rotary motion will be imparted to the sprocket wheel 49 and through the sprocket wheel rotate the shaft 2. Preferably the diameter of the rollers will be such that there will be only a slight radial movement of the sections 31 required in order to clamp the rollers 31 and lock them to their sleeves and to the tracks 35 and 47.

While I have shown the preferred form of my invention insofar as it is embodied in a clutch mechanism, it will of course be understood that the invention is not limited to the specific details of construction shown, and any variation thereof which will be included within the language of the following claims, I of course regard as being within the scope of the invention.

I claim:

1. In a friction device, opposed clamping elements capable of relative movement in parallel lines, a length of chain with detached ends interposed between said clamping elements, a plurality of rolls carried by said chain normally free to rotate on axes extending transversely to the path of relative movement of the clamping elements, and means to cause said clamping elements to clamp and release said rolls to lock said clamping elements together or to release them for relative movement.

2. In a friction device, a curved bed, a plurality of rolls surrounding said bed, a length of chain comprising pivotally connected links to support said rolls on said bed to freely rotate thereon, a casing enclosing said bed, chain, and rolls having a curved inner contact face closely adjacent to the bed and rolls, and means to cause said bed to expand said chain to clamp the rolls between the bed and the contact face of the casing.

3. In a friction device, a rotary expanding circular bed, a plurality of rolls surrounding and supported by said bed, a flexible carrier chain with detached ends for said rolls, a circular casing enclosing and surrounding said rolls and bed, and means to radially expand the rotary bed and the roll carrier chain to clamp the rolls between the rotary bed and the surrounding casing.

4. In a friction device, a rotary expanding circular bed, a plurality of rolls surrounding and supported by said bed, an articulated flexible chain carrier for said rolls, said rolls being mounted upon the joints of said chain, a circular casing enclosing and surrounding said rolls and bed, and means to radially expand the rotary bed and the chain roll carrier to clamp the rolls between the rotary bed and the surrounding casing.

5. In a friction device, a rotary expanding circular bed, a plurality of rolls surrounding and supported by said bed, an articulated flexible carrier for said rolls having free ends, a circular casing enclosing and surrounding said rolls, carrier and bed, tracks carried by said bed and casing arranged in opposed relation to each other, the said tracks and rolls being in the same vertical plane, and means to radially expand the rotary bed and the roll carrier to clamp the rolls between the rotary bed and the surrounding casing.

6. In a friction device, a rotary expanding bed comprising a plurality of segmental sections, a plurality of rolls surrounding and supported by said bed, a flexible carrier for said rolls, said chain having free ends, a circular casing enclosing and surrounding said chain rolls, carrier and bed, a plurality of cams for expanding the segmental sections or bed, and means to operate said cams to expand the bed to clamp the rolls between the bed and the surrounding casing.

7. In a friction device, a rotary shaft, a supporting bed mounted thereon to rotate therewith, a flexible carrier chain having free ends supported by the bed, a plurality of rolls carried by said carrier, a surrounding casing enclosing the rolls and carrier, and means to expand the bed to radially clamp the rollers between said bed and the surrounding casing.

8. In a friction device, a rotary shaft, a hub mounted thereon to rotate therewith, a bed comprising segmental sections supported by said hub, cam rods interposed between the adjacent ends of the segmental sections and means to operate said cam rods to radially expand said segmental sections, a surrounding casing, and a plurality of rolls mounted on a carrier chain having free ends located between the bed and casing, and means whereby the radial movement of the segmental sections will clamp the rollers between the bed and casing.

9. In a friction device, opposed clamping elements capable of relative movement in parallel lines, a plurality of rollers disposed between the opposed clamping elements and normally free to rotate on axes extending transversely to the path of relative movement of the clamping elements, said rollers being disposed around bushings fixed against rotation so that when pressure is exerted on said rollers at diametrically opposite points they are frictionally held by said bushings against rotation, and means to cause said clamping elements to clamp and release said rollers to lock said clamping elements together or to release them for relative movement.

10. In a friction device, a rotary expanding circular bed, a plurality of normally rotatable rollers surrounding and supported by said bed, said rollers being disposed on bushings fixedly secured to a flexible carrier so that when pressure is exerted on said rollers at diametrically opposite points they will frictionally engage said bushings and be held against rotation, a circular casing enclosing and surrounding said rollers and bed, and means to radially expand the rotary bed to clamp the rollers between the rotary bed and the surrounding casing.

11. In a friction device, a rotatable shaft, a circular bed disposed around and rotatable with said shaft, said bed being formed of segmental sections so as to be expandable radially, and having a track in the form of an annular rib on its outer face, a circular casing disposed around and spaced radially from said bed and having a track formed on its inner face opposite the track on the bed, a plurality of rollers disposed between the tracks on the casing and bed and normally rotatable therebetween, said rollers being disposed around bushings fixedly secured to a flexible carrier so that when pressure is exerted on said rollers they are frictionally held by said bushings against rotation, and means including members extending between the segments of said bed for expanding said bed radially and causing pressure to be exerted on said rollers by the tracks on the bed and casing, thereby causing said casing and shaft to be coupled together.

12. In a friction device, a drive shaft and a driven shaft, said drive shaft having a circular bed disposed around and rotatable with it, said bed being formed of segmental sections so as to be expandable radially, and having a track in the form of an annular rib on its outer face, said driven shaft having secured thereto a circular casing disposed around and spaced radially from said bed and having a track formed on its inner face opposite the track on the bed, a plurality of rollers disposed between the tracks, on the casing and bed and normally rotatable therebetween, said rollers being disposed around bushings fixedly secured to a flexible carrier so that when pressure is exerted on said rollers they are frictionally held by said bushings against rotation, and means including members extending between the segments of said bed for expanding said bed radially and causing pressure to be exerted on said rollers by the tracks on the bed and casing, thereby coupling said drive shaft and driven shaft together.

13. In a friction device, a rotary bed, a casing surrounding said bed, said bed and casing having opposed friction surfaces spaced apart from each other, a flexible carrier comprising a length of chain composed of pivoted links, the ends of said carrier being free and spaced apart from each other, friction surfaces on said carrier, said carrier supported by said bed between the friction surfaces carried by the bed and casing, and means to impart a relative movement to said bed and casing to cause the friction surfaces of the bed and casing to engage the friction surfaces of the flexible carrier.

JOHN F. McCANN.